United States Patent [19]
Ahsbahs et al.

[11] Patent Number: 5,719,658
[45] Date of Patent: Feb. 17, 1998

[54] PROGRESSIVE MULTIFOCAL OPHTHALMIC LENS

[75] Inventors: Francoise Ahsbahs, Saint Maur; Thierry Baudart; Gilles Le Saux, both of Paris, all of France

[73] Assignee: Essilor International, Charention Le Pont, France

[21] Appl. No.: 502,663

[22] Filed: Jul. 14, 1995

[30] Foreign Application Priority Data

Apr. 21, 1995 [FR] France ................ 95 04800

[51] Int. Cl.⁶ ........................................... G02C 7/06
[52] U.S. Cl. ........................................... 351/169
[58] Field of Search ........................ 351/168–172, 351/177

[56] References Cited

U.S. PATENT DOCUMENTS 5,488,442  1/1996  Harsigny et al. ............... 351/169

Primary Examiner—Scott J. Sugarman
Attorney, Agent, or Firm—Fish & Richardson P.C.

[57] ABSTRACT

In a progressive multifocal ophthalmic lens providing excellent performance in the far vision region, good width of the near vision region and gentle progression in the intermediate vision region therebetween, the far vision region comprises an angular sector defined by two half-lines that intersect at the geometrical center of the lens forming an upwardly-directed angular segment with an included angle of preferably more than 145° in which all points have a cylinder less than A/2 diopters, and constraints are applied governing the gentleness of progression in the intermediate vision region and the relative width of the near vision region.

10 Claims, 5 Drawing Sheets

PROGRESSIVE MULTIFOCAL OPHTHALMIC LENS

BACKGROUND OF THE INVENTION

The present invention relates to a progressive multifocal ophthalmic lens having an aspherical surface comprising a far vision region, a near vision region, an intermediate vision region, a main meridian of progression passing through said three regions and a fitting center, said lens having a power addition factor A defined as the variation in mean sphere between a control point in the near vision region and a control point in the far vision region.

French patent application 2,699,294 which is incorporated herein by reference, describes in its introductory part the various elements of a progressive multifocal ophthalmic lens (main meridian of progression, far vision area, near vision area, etc.) along with the work carried out by this present applicant for improving the comfort of spectacle wearers.

The applicant has thus proposed, with a view to satisfying the visual requirements of long-sighted (presbytic) spectacle wearers and in order to improve the comfort of progressive multifocal lenses, to adapt the shape of the main meridian of progression, as a function of the power addition factor A (see French patent application 2,683,642).

Existing lenses can be still further improved, notably in order to reduce peripheral vision defects, and to increase wearer comfort. Wearers of progressive multifocal lenses are sometimes inconvenienced by problems with dynamic vision, or with problems when viewing through the lateral portions of far and near vision areas of spectacles.

SUMMARY OF THE INVENTION

The present invention provides a progressive multifocal lens which overcomes the disadvantages of prior art lenses and which provides excellent performance in the far vision region, gentle progression over the intermediate vision region and good width of the near vision region while allowing substantial lateral excursion outside of the near vision region.

The invention provides a progressive multifocal ophthalmic lens having an aspherical surface comprising a far vision region, a near vision region, an intermediate vision region, a main meridian of progression passing through said three regions and a fitting center, said lens having a power addition factor A defined as the variation in mean sphere between a control point in the near vision region and a control point in the far vision region, in which:

limits of said far, intermediate and near vision regions are defined by isocylinder lines of a value equal to A/2, said far vision region comprises at least one angular sector with an included angle $\alpha$ greater than or equal to 145°, within said intermediate vision region, following relation holds at each point along said main meridian of progression:

$$p(y) \cdot L_p / l_{A/2}(y) < \lambda A$$

in which:

p(y) is a slope of the mean sphere at a point y on the y-axis, $L_p$ is a length of progression, and $l_{A/2}(y)$ is a width of the intermediate vision region at a point y on the y-axis, $\lambda$ has a value comprised between 0.125 and 0.15 mm$^{-1}$ and in which at a point on the y-axis 18 mm below said fitting center of the lens, the following relation holds:

$$l_{A/2} \cdot A_{VP} / C_{VP} > 14 \text{ mm}$$

in which:

$l_{A/2}$ is a width of said near vision region $A_{VP}$ is a relative power addition, equal to a difference between mean sphere at a point on said main meridian of progression 18 mm below said fitting center and mean sphere at said fitting center, and $C_{VP}$ is a maximum cylinder of a horizontal segment extending over a surface of said lens.

In a preferred embodiment, the value of $\lambda$ is of the order of 0.14 mm$^{-1}$.

According to a preferred embodiment, half-lines that define said angular sector intersect at the geometrical center of said lens, and the bisector of said angular sector makes an angle of less than 5° and preferably less than 2° with the vertical.

Isocylinder lines of a value equal to A/2 are advantageously asymptotic to the half-lines defining said angular sector.

According to a preferred feature, the said length of progression $L_p$ is the vertical distance between said fitting center and a point in said near vision region at which the power addition factor is 85° of the maximum, and the fitting center is advantageously located 4 mm above the geometrical center of the lens.

Advantageously, a curve that graphically represents the function:

$$p(y) \cdot L_p / l_{A/2}(y)$$

in which p(y) is a slope of the mean sphere at a point y on the y-axis $L_p$ is a length of progression, and $l_{A/2}(y)$ is a width of the intermediate vision region at a point y on the y-axis, has a bell shape, the concavity of which is directed downwardly.

Advantageously, the maximum cylinder of said lens is calculated over a horizontal segment and for those points on said lens situated at a distance of less than 20 mm from the geometrical center of said lens.

Further features and advantages of the present invention will become more clear from the description which follows of a preferred embodiment of the invention provided by way of example and with reference to the attached drawings.

DETAILED DESCRIPTION OF A PREFERRED EMBODIMENT

Figure 1:
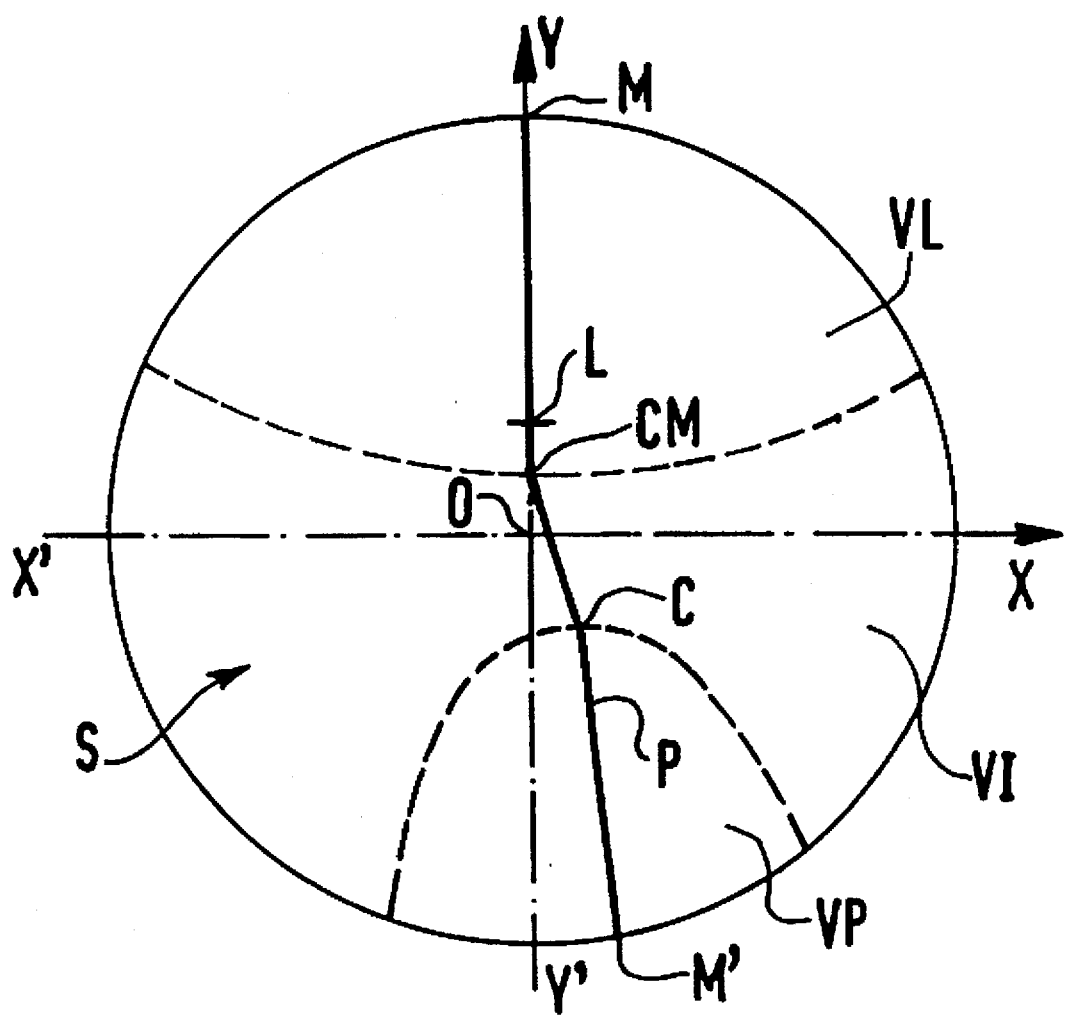
FIG. 1 is a diagrammatical front view of a progressive multifocal lens.

Throughout the description, an orthonormal system of coordinates shown in FIG. 1 is employed, where the x-axis corresponds to the horizontal axis of the lens and the y-axis corresponds to the vertical axis.

FIGS. 1 and 3 to 8 show the optical characteristics of various lenses, for a diameter limited to a value of 40 mm. One embodiment of the invention is described with reference to FIGS. 3 to 8.

FIG. 1 is a front view of a progressive multifocal lens 1. Lens 1 has an aspherical face shown on FIG. 1 and a further face which may be spherical, toroidal or aspherical. In FIG. 1, the line in heavy print is the main meridian of progression MM' of the lens, the position of the far vision control point L and the near vision control point P being shown.

Conventionally, lens 1 includes a far vision area VL in its upper part, a near vision area VP in its lower part, with an intermediate region VI between the two. The point O in FIG. 1 is the geometrical center of lens 1.

The main meridian of progression MM' of the lens is essentially composed of three segments, the first of which extends substantially vertically down from the top of the lens, passing through the control point L down to a point CM known as the fitting center, located between control point L and the geometrical center O. The second segment extends from the point CM obliquely towards the side of the lens nearest the nose, and the third segment starts from the end C of the second segment, passing through the near vision control point P. The relative angles between these three segments advantageously vary as a function of the power addition factor A and as a function of the far vision power, as described by the present applicant in U.S. Pat. No. 5,270,745.

At every point on the aspherical surface a mean sphere D is defined given by the formula:

$$D = \frac{n-1}{2} \left( \frac{1}{R_1} + \frac{1}{R_2} \right)$$

in which:

$R_1$ and $R_2$ are the maximum and minimum radii of curvature expressed in meters, and n is the refractive index of the material constituting the lens.

For a given lens, the power addition factor A is equal to the variation in means sphere between the far vision control point L and the near vision control point P.

The lens's cylinder or surface astigmatism C is also defined, given by the formula:

$$C = (n-1) \left| \frac{1}{R_1} - \frac{1}{R_2} \right|$$

Lines constituted by the projection onto a plane, said plane being tangential to the progressive surface at the geometrical center 0, of those points on the surface that have the same mean sphere value, are called lines of isosphere. Similarly, lines constituted by the projection onto said plane of those points on the surface that have the same cylinder value are called lines of isocylinder.

According to the invention, it is considered that, for a lens of power addition factor A, the isocylinder line joining points having a mean cylinder of A/2 diopters substantially defines the limit of the far, intermediate and near vision regions. In other words, the isocylinder line A/2 defines the near vision region in the upper part of the lens. It defines the intermediate vision region in the middle part of the lens and, finally, defines the near vision region in the lower part of the lens. Compared to the definition in the prior art which adopted absolute limits that were independent of the power addition factor, this definition corresponds better to reality as actually perceived by the spectacle wearer.

In prior art lenses, and in particular in those provided by the applicant, vision in the area surrounding the main meridian of progression is completely satisfactory.

The present invention proposes that a new definition of the characteristics of the lens surface be considered. This new definition makes it possible to improve lens performance as perceived by the spectacle wearer in the near vision region, as well as the gentleness of transition in the intermediate vision region, between the near vision region and the far vision region. This new definition thus preserves an extended far vision region which is agreeable to the spectacle wearer.

The rear face of the lens according to the invention is employed for adapting the lens to the specific requirements of the wearer, this rear face being able to be spherical, toroidal or aspherical.

According to the invention, the far vision region VL comprises at least one angular sector defined by two half-lines that are secant at the geometrical center O of the lens. These half-lines form an upwardly-directed angular segment having an angular width $\alpha$: inside this angular segment, and in line with the definition of the far vision region according to the invention, all points have a cylinder less than A/2 diopters. Advantageously, for all values of power addition factor A, angle $\alpha$ is greater than 145°.

Preferably, a line that (internally) bisects the angular segment formed by the said two half-lines is substantially vertical, for all values of power addition factor. More precisely, a bisecting line of the two half-lines preferably makes an angle $\beta$ of less than 5° with the vertical; in a preferred embodiment, this angle $\beta$ is less than 2°.

Furthermore, the A/2 diopter isocylinder lines are advantageously asymptotic to the half-lines defining the angular segment: as one moves away from the geometrical center of the lens towards its periphery, the A/2 diopter isocylinder lines increasingly approximate to the half-lines. Quantitatively, the distance between an A/2 isocylinder line and the corresponding half-line is less than 2 mm for that part of the lens constituted by those points that are more than 10 mm further away from the geometrical center O of the lens.

The invention proposes a constraint on the A/2 isocylinder positions in the middle portion of the lens, using a criterion of relative gentleness of progression which takes into account the slope of the mean sphere along the meridian, the length of progression and the width of the intermediate vision region. In order to arrive at a suitable function p to represent said slope, we assume that mean sphere as defined hereinabove is the function associated with each point (x,y), the slope of the mean sphere then being equal to the Euclidian norm of the gradient of the mean sphere. This enables the function p to be defined as the function that associates to any y-axis value $y_0$ the value $p(y_0)$ of the slope of mean sphere at that point on the meridian having said y-axis value $y_0$. This function $p(y)$ is used below for criterion $D_{VI}$ associating the slope of mean sphere along the meridian with a y-axis value on the lens.

The length of progression is defined as follows. The fitting center CM of the progressive lens corresponds to a point on the lens that is employed by the optician for correctly fitting the lens into the frame. This fitting center corresponds to the intersection between the surface of the lens and the wearer's line of vision when he is looking in a horizontal direction. In lenses produced by the assignee, this fitting center is generally located 4 mm above the geometrical center of the lens. The length of progression (referred to as $L_p$ below) is equal to the vertical distance between the fitting center and the near vision control point at which 85% of the total power addition value is reached, in other words the absolute value of the difference between the y-axis values of these two points. This length $L_p$ is a way of representing, in all lenses, the vertical distance through the intermediate vision region.

The width of the intermediate vision region, or horizontal width $l_{A/2}(y)$ at the A/2 isocylinder line is the difference in the x-axis values of two A/2 isocylinder lines, for a given y-axis value.

These three values now enable us to define, for any given lens, a function of the y-axis value that is representative of the relative gentleness of progression in the intermediate vision region. This function $D_{VI}(y)$ is equal to the product of the slope of the mean sphere $p(y)$ multiplied by the ratio between the length of progression $L_p$ and the width of the intermediate vision region (or horizontal distance) $l_{A/2}(y)$, which can also be written as:

$$D_{VI}(y)=p(y)\cdot L_p/l_{A/2}(y)$$

This function is representative of the optical qualities which the wearer may experience in the intermediate vision region.

According to the invention, the intermediate vision region is defined in such a way as to minimize the value of relative gentleness of progression $D_{VI}$. Advantageously, the graphical shape of the function $D_{VI}(y)$ has a bell-shape, the maximum value of which is below a value proportional to the power addition factor. More precisely, the maximum of the function $D_{VI}(y)$ is less than a product $\lambda A$, this being the power addition factor A multiplied by a coefficient $\lambda$. The value of this coefficient $\lambda$ is comprised in a range of from 0.125 to 0.15 $mm^{-1}$, and preferably is of the order of 0.14 $mm^{-1}$.

The A/2 isocylinder lines in the intermediate vision region are defined so as to satisfy these conditions governing $D_{VI}(y)$.

The invention proposes to apply a constraint to the positions of the A/2 isocylinder lines in the lower part of the lens, using a near vision relative width criterion $LR_{VP}$ which takes account of the relative power addition factor along the meridian, the width of the near vision region (horizontal width at the A/2 isocylinder line), and the maximum value of cylinder outside the near vision region. This relative width criterion is defined, for a given value on the y-axis, 18 mm below the fitting center CM. In the applicant's lenses, this y-axis value corresponds to the near vision control point P.

The relative power addition factor $A_{VP}$ is defined as the difference, considered along the main meridian of progression MM', of the mean sphere at the y-axis value 18 mm below the fitting center CM, and the mean sphere at the fitting center CM.

At a y-axis value 18 mm below the fitting center CM, the horizontal width $l_{A/2}$ between the A/2 isocylinder lines is measured, this corresponding to the width of the near vision region and being equal to the distance between the x-axis values of two points on the two A/2 isocylinder lines the y-axis value of which is 18 mm less than that of the fitting center.

Finally, the maximum cylinder $C_{VP}$ over a horizontal segment comprising all the y-axis points $y=-14$ mm (18 mm below the fitting center) which are less than 20 mm from the geometrical center (20 mm being the useful radius of the lens) is measured; in terms of x-axis values, one thus considers those points for which the x-axis value is, in terms of modulus, less than $\sqrt{(20^2-14^2)}=14.3$ mm. Stated in other terms, what is considered is the maximum cylinder 18 mm below the fitting center over the whole width of the lens, even beyond the limits of the near vision region.

The relative width for near vision $LR_{VP}$ is defined as follows:

$$LR_{VP}=l_{A/2}\cdot A_{VP}/C_{VP}$$

This relative width is representative not only of the width of the near vision region, but also of the gentleness of progression of the lens outside said near vision region, at 18 mm below the fitting center CM. According to the invention, the near vision region is defined so as to maximise the value of the relative width for near vision $LR_{VP}$; advantageously, this is greater than a value of the order of 14 mm, for all values of power addition factor. The A/2 isocylinder lines are determined in the near vision region so that this condition may be satisfied.

Figure 2:
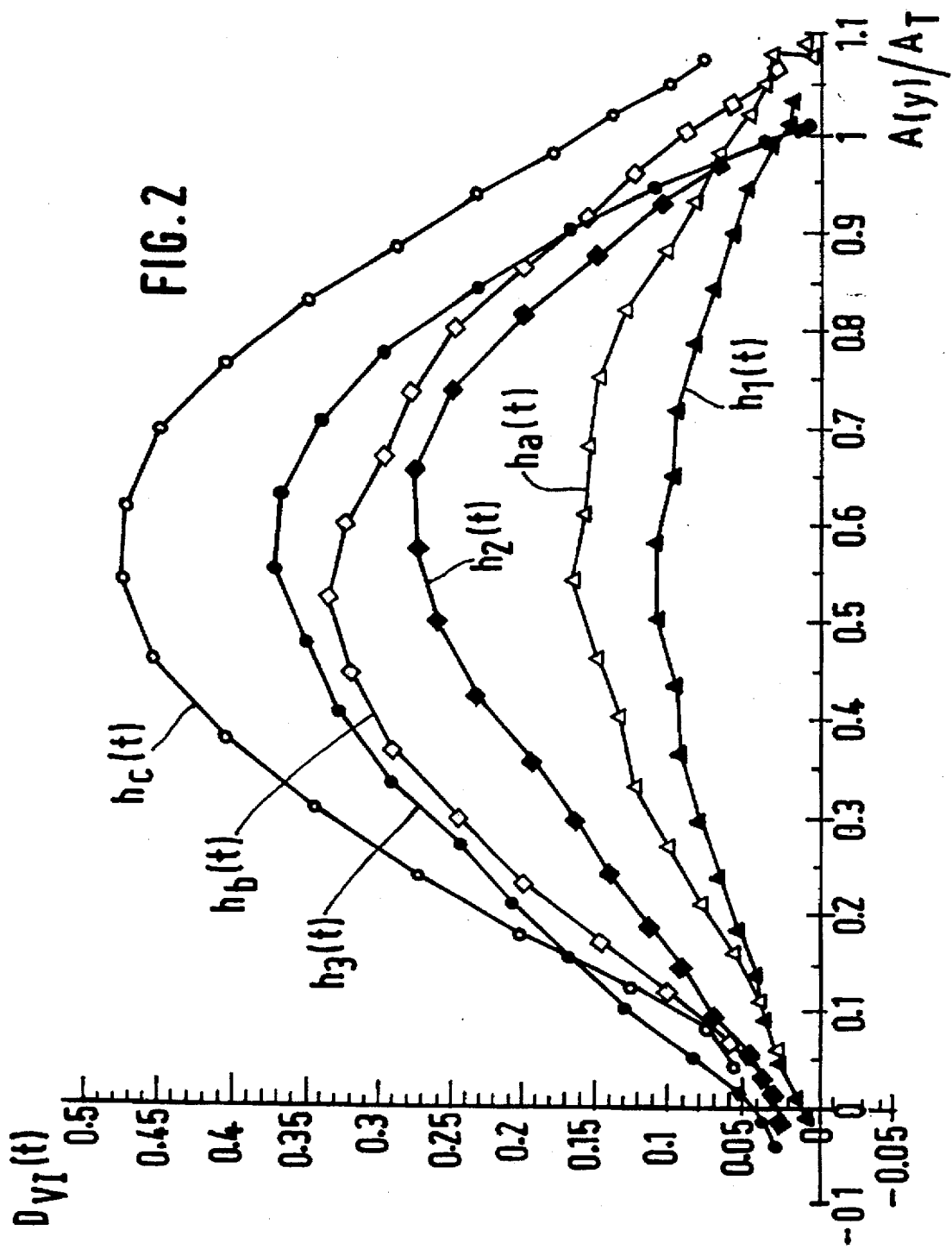
FIG. 2 shows graphs of the function $D_{VI}$ representing relative gentleness of progression at the intermediate vision region for various power addition factors and after normalization of the x-axis values.

In FIG. 2, the function $D_{VI}$ of relative gentleness of progression in the intermediate vision region has been plotted for various power addition factors, after normalizing the x-axis values. In order to readily compare lenses having their VP control point and CM fitting center situated at different points on the y-axis, the x-axis values have been normalized on FIG. 2: thus we have not directly plotted the graphical representation of the function $D_{VI}(y)$ as a function of y, but rather as a function of a parameter t, where:

$$t=g(y)=A(y)/A_T$$

in which $A(y)$ is the difference in mean sphere between a point on the main meridian of progression for the value of y, and the fitting center, and in which $A_T$ is the difference in means sphere between the fitting center and the near vision control point VP along the main meridian of progression, below the fitting center.

The parameter t varies over the range [0,1] and in FIG. 2, the function $h(t)$ has been shown where:

$$h(t)=D_{VI}[g^{-1}(t)]$$

FIG. 2 shows plots of $h_1(t)$, $h_2(t)$ and $h_3(t)$ respectively for power addition factors of 1, 2 and 3 diopters corresponding to the lenses in FIGS. 3 and 4, 5 and 6, 7 and 8. Each one of these curves has a clearly defined bell shape with a maximum at 0.11, 0.275 and 0.372 diopter·$mm^{-1}$, which is well below the value of 0.14 multiplied by A, in other words respectively 0.14×1, 0.14×2 and 0.14×3 diopters·$mm^{-1}$.

The corresponding curves $h_a(t)$, $h_b(t)$ and $h_c(t)$ for a family of lenses of the prior art have also been shown, for respective power addition factors of 1, 2 and 3 diopters. It can be clearly seen that even though these three curves have a bell shape, their maximum is substantially above the above-stated values of 0.14, 0.28 and 0.42 diopters·$mm^{-1}$ (0.14 times A).

FIGS. 3 to 8 are front views of lenses according to the invention showing the main meridian of progression and the lines of equal levels of mean sphere and cylinder. The lenses in FIGS. 3 and 4, 5 and 6, 7 and 8 correspond respectively to power addition factors of 1, 2 and 3 diopters, provided by way of example.

Figure 3:
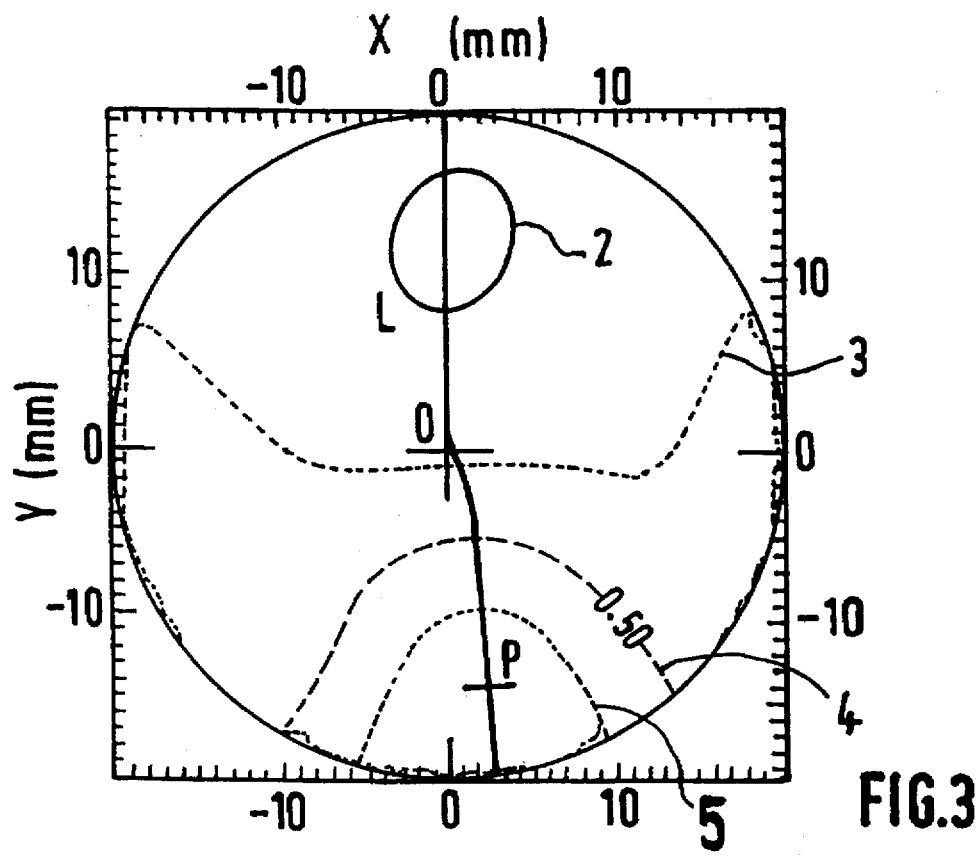
FIG. 3 is a front view of a lens according to the invention, having a power addition factor of 1 diopter, showing the main meridian of progression and lines joining points with the same mean sphere value.
Figure 4:
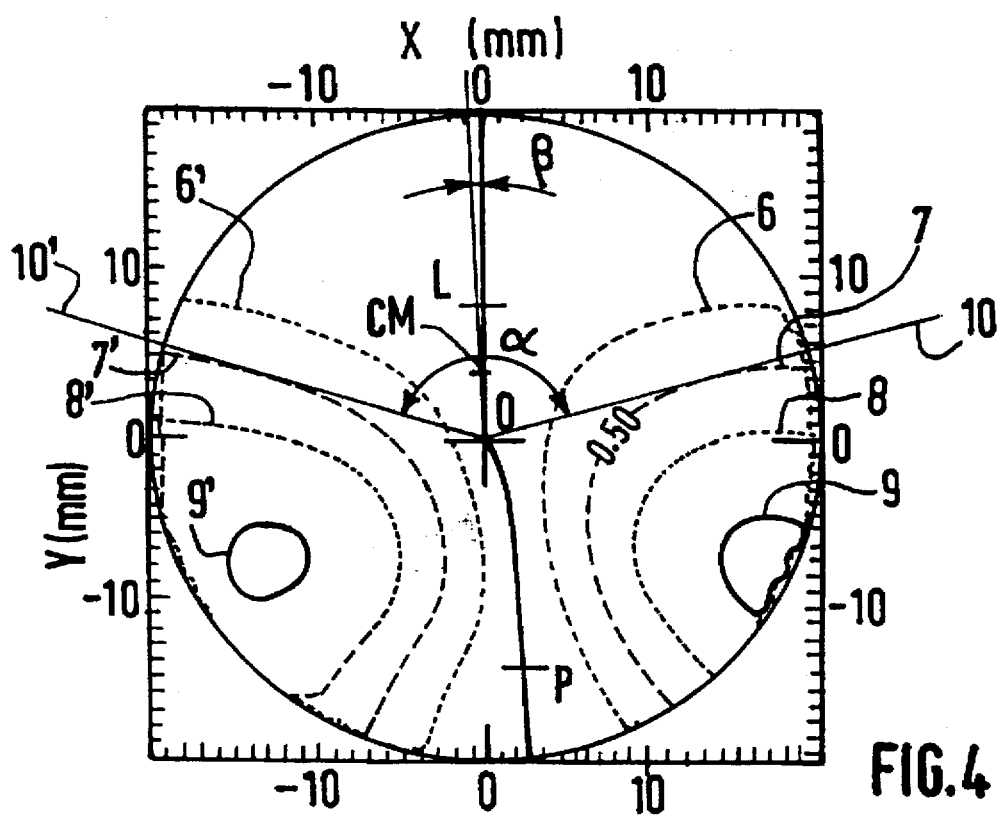
FIG. 4 is a front view of a lens according to the invention, for a power addition factor of 1 diopter, showing the main meridian of progression and lines joining points with the same cylinder value.

FIGS. 3 and 4 correspond to a power addition factor of 1 diopter.

In FIG. 3, the elements from FIG. 1 are again shown. Additionally the fitting center CM is shown on FIG. 3, and the lines of isosphere. The lines of isosphere in FIG. 3 are the lines 2, 3, 4, 5 respectively showing a mean sphere equal to that at the far vision control point L, and respectively greater by 0.25, 0.5, 0.75 diopters.

Similarly, on FIG. 4, the elements from FIGS. 1 and 3 are again reproduced with the addition of lines of isocylinder. As the cylinder is low all along the main meridian of progression, there are two isocylinder lines for each value of cylinder. The isocylinder lines in FIG. 4 are the lines 6 and 6', 7 and 7', 8 and 8', 9 and 9' corresponding, respectively, to a cylinder of 0.25, 0.5, 0.75 or 1.0 diopter.

As indicated above, the limits of the near vision region are substantially constituted, in the upper part of the lens, by the lines 7 and 7' of isocylinder equal to A/2,=0.5 diopters.

As can be seen on FIG. 4, the far vision region VL does indeed comprise the angular segment defined by two half-lines 10 and 10'. The angle α between these half-lines has a value of the order of 149.6°: the half-line 10' makes an angle of the order of 15.4° with the horizontal, and the half-line 10 makes an angle of the order of 15° with the horizontal. The angle β then has a value of 0.2°, and is well below 2°. As can be seen on FIG. 4, the A/2=0.5 diopter isocylinder lines are asymptotic to the half-lines 10 and 10'. The relative gentleness of progression in the intermediate vision region $D_{VI}(Y)$ represented on FIG. 2 by the normalized curve $h_1(t)$ satisfies the conditions of this invention very well. Finally, the relative width for near vision $LR_{VP}$ has a value of 14.1 mm which is above 14 mm.

Figure 5:
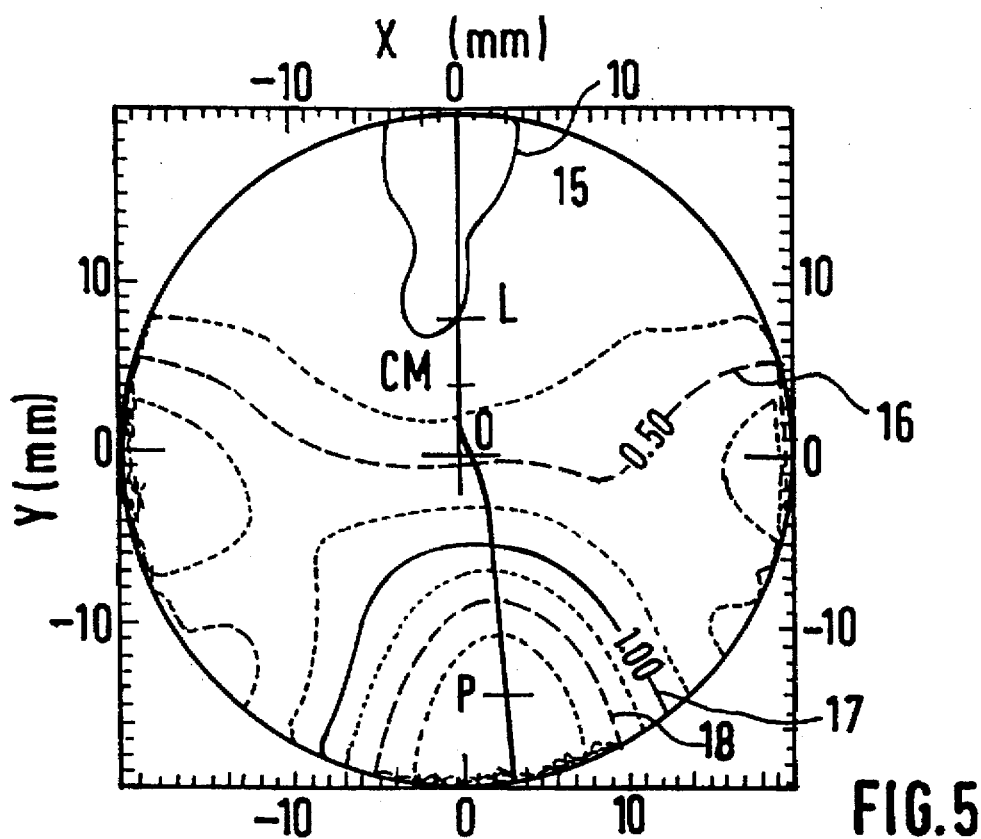
FIG. 5 is a view similar to FIG. 3, for a power addition factor of 2 diopters.

FIG. 5 shows a similar view to FIG. 3, for a power addition factor of 2 diopter; on FIG. 5, the lines 15, 16, 17, 18 of mean isosphere 0, 0.5, 1 and 1.5 diopters higher than the sphere at control point L have been shown.

Figure 6:
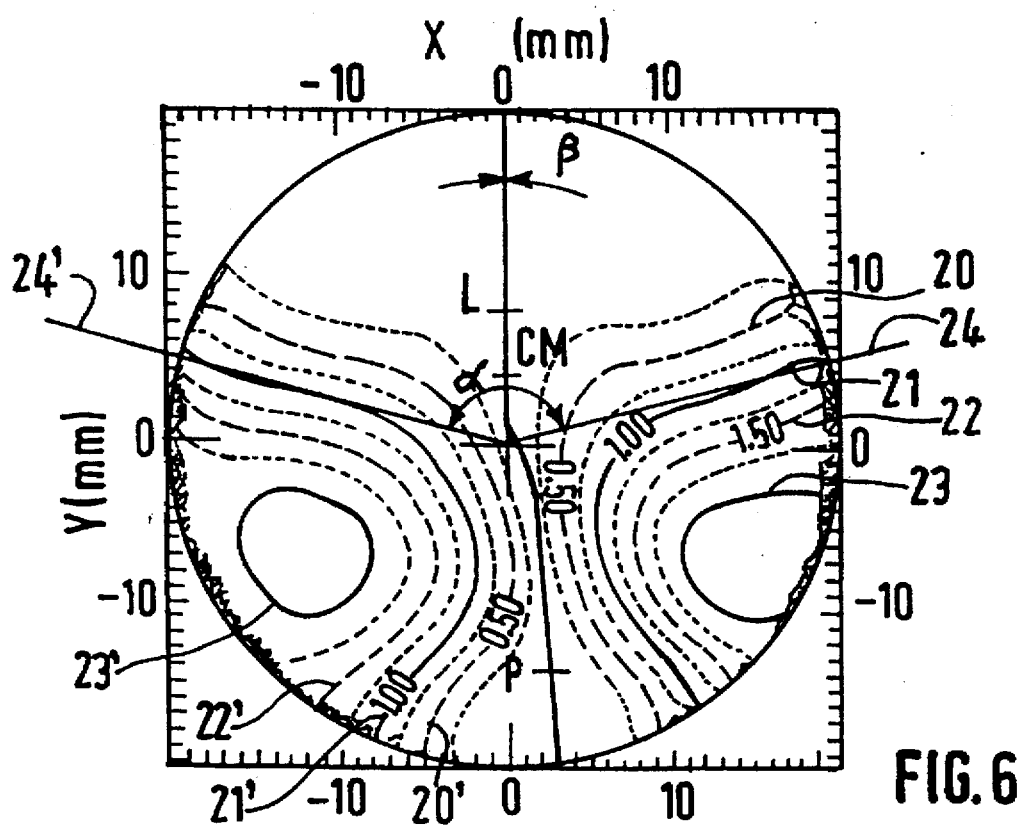
FIG. 6 is a view similar to FIG. 4, for a power addition factor of 2 diopters.

FIG. 6 is a similar view to that in FIG. 4, for a power addition factor of 2 diopters, in other words for the lens in FIG. 5. In FIG. 6, the lines 20 and 20', 21 and 21', 22 and 22', 23 and 23' for 0.5, 1, 1.5 and 2 diopters isocylinder can be seen. Like the lens in FIGS. 3 and 4, the near vision region (A/2=1 isocylinder in the upper part of the lens) comprises at least one segment defined by two half-lines 24, 24', that intersect at the geometrical center of the lens with an included angle α of 151°.

The half-line 24' makes an angle of the order of 14.5° with the horizontal, and the half-line 24 makes an angle of the order of 14.5° with the horizontal. The angle β is here 0°, which is well below 2°.

As can be seen on FIG. 6, the A/2=1 diopter isocylinder lines 21 and 21' are asymptotic to the half-lines 24 and 24'. The relative gentleness of progression in the intermediate vision region $D_{VI}(Y)$, represented on FIG. 2 by the normalized curve $h_2(t)$ satisfies the conditions of the invention. Finally, the relative width for the near vision region $LR_{VP}$ has a value of 16.5 mm which is well above 14 mm.

Figure 7:
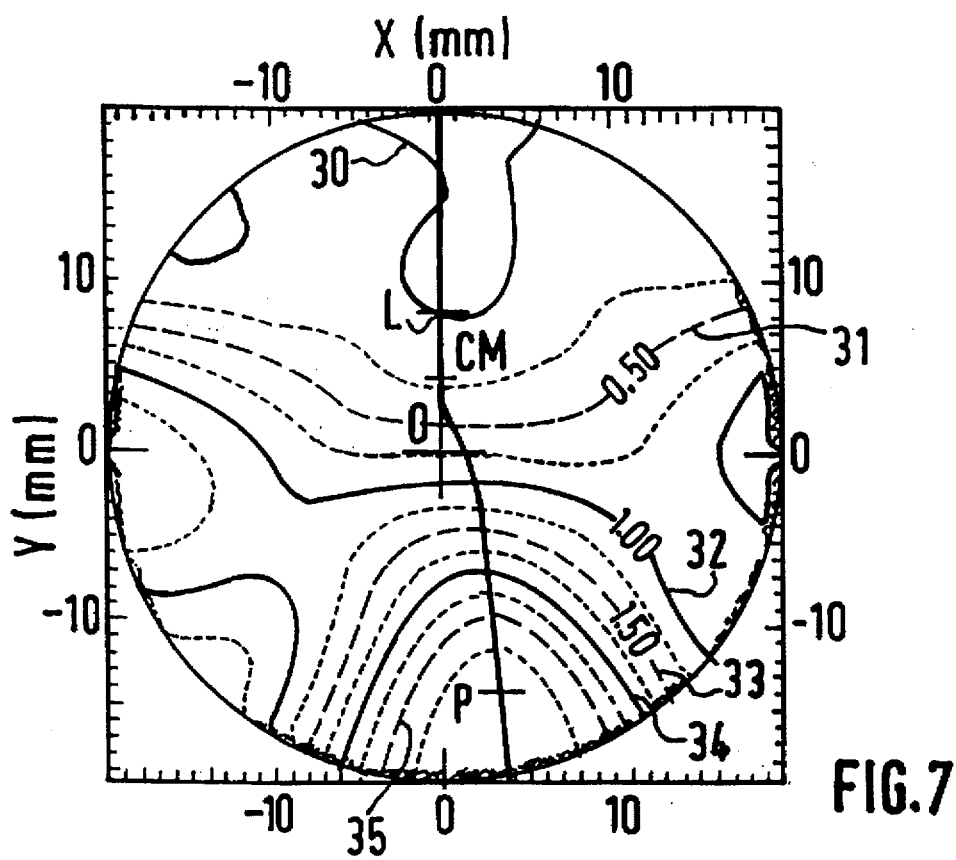
FIG. 7 is a view similar to FIG. 3, for a power addition factor of 3 diopter.

FIG. 7 is a similar view to that in FIG. 3, for a power addition factor of 3 diopters; on FIG. 7 the same elements as those shown on FIG. 3 can be seen, and notably the lines 30, 31, 32, 33, 34 and 35 for respectively, a mean isosphere of 0, 0.5, 1, 1.5, 2 and 2.5 diopters above the sphere at control point L.

Figure 8:
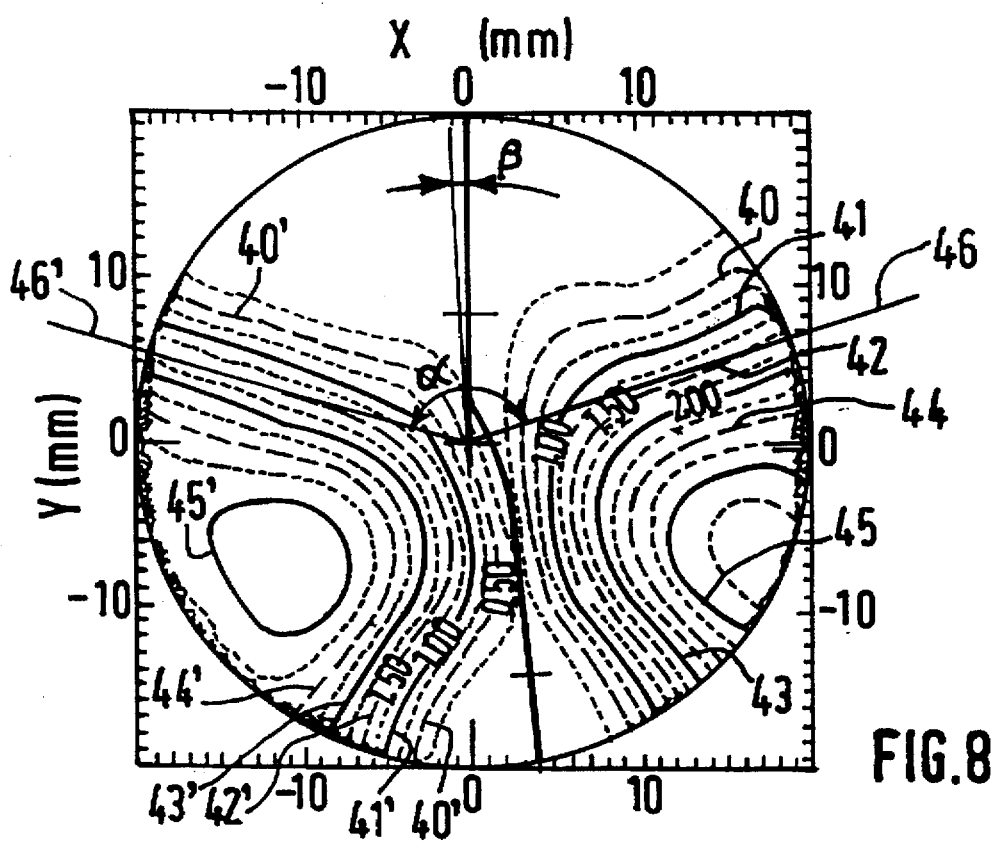
FIG. 8 is a view similar to FIG. 4, for a power addition factor of 3 diopters.

FIG. 8 is a similar view to that in FIG. 4, for a power addition factor of 3 diopters, in other words for the lens in FIG. 7. On FIG. 8, the lines 40 and 40', 41 and 41', 42 and 42', 43 and 43', 44 and 44', 45 and 45' for isocylinder values of 0.5, 1, 1.5, 2, 2.5, and 3 diopters can be seen. Like the lenses in FIGS. 3, 4, 5 and 6, the near vision region (A/2=1.5 isocylinder in the upper portion of the lens) comprises at least one segment defined by two half-lines 46, 46' that intersect at the geometrical center, and making an angle α of 145°.

The half-line 46' makes an angle of the order of 16° with the horizontal, and the half-line 46 makes an angle of the order of 19° with the horizontal. The angle β then has a value of 1.5° which is well below 2°. As can be seen on FIG. 8, the isocylinder lines 42 and 42' for A/2=1.5 diopters are asymptotic to the half-lines 46 and 46'.

The relative gentleness of progression in the intermediate vision region $D_{VI}(Y)$, shown on FIG. 2 by the normalized curve $h_3(t)$ satisfies the conditions of the invention in a satisfactory manner. Finally, the relative width for near vision $LR_{VP}$ has a value of 15.1 mm, which is well above 14 mm.

We shall now discuss the various characteristics that make it possible to provide the various lenses according to the invention. The surface of the lenses is, as is known in a manner known per se, continuous and continually derivable three times.

For each one of the lenses of the family, a main meridian of progression is defined. For this, it is advantageous to use the teachings of the above mentioned French patent 2,683, 642 which is wholly incorporated herein by reference. It is also possible to use any other definition of the main meridian of progression in order to apply the teachings of the invention.

A constraint is fixed at the far vision region (A/2 isocylinder at the upper portion of the lens) by requiring that it covers at least an angular sector defined by two half-lines that intersect at the geometrical center of the lens and making an angle of at least 145°; advantageously, the bisecting line of this sector makes an angle of at most 2° with the vertical. The A/2 isocylinder lines are asymptotic to these half-lines at least for those points situated at a distance from the center of the lens comprised between 10 and 20 mm. In the sector defined between these two half-lines, the cylinder is less than A/2 diopters. These values make it possible to provide a dimension for the far vision region that provides excellent performance for the spectacle wearer.

If necessary and as a function of the choice of the main meridian of progression, the point of intersection of the two half-lines could be different from the geometrical center of the lens; the point of intersection could then correspond to the position of the fitting center, or to the far vision control point L.

A constraint is also applied to the intermediate vision region (A/2 isocylinder of the middle portion of the lens) by requiring that the relative gentleness of progression in the intermediate vision region $D_{VI}$ satisfies the conditions stated above.

Finally, a constraint is applied to the near vision region (A/2 isocylinder in the lower portion of the lens) by requiring that the relative width in the near vision region $LR_{VP}$ meets the condition stated above.

Thus, a region has been defined for the whole lens for which the cylinder is lower than A/2 diopters, not only with the aid of straight line segments, but also using functions which ensure excellent performance for the spectacle wearer, even when power addition factors are high.

In order to completely define a lens according to the invention, the constraints listed above are employed, or only certain ones of them, as limiting conditions in an optimization program known per se, so as to obtain a map of the altitudes at different points on the lens. This makes it possible, using a process known per se, to prepare molds for molding the lenses using organic or inorganic materials. By way of example, in order to define lenses with powers of 1, 2 and 3 diopters, one can impose the conditions stated with reference to FIGS. 2, 4, 6 and 8. These various conditions make it possible to determine the surface of the lens.

Obviously, the present invention is not limited to these examples: thus, among other things, the aspherical surface could be the surface directed towards the spectacle wearer.

What is claimed is:

1. A progressive multifocal ophthalmic lens having an aspherical surface comprising a far vision region, a near vision region, an intermediate vision region, a main meridian of progression passing through said three regions and a fitting center, said lens having a power addition factor A defined as the variation in mean sphere between a control point in the near vision region and a control point in the far vision region, in which:

limits of said far, intermediate and near vision regions are defined by isocylinder lines of a value equal to A/2, said far vision region comprises at least one angular sector with an included angle $\alpha$ greater than or equal to 145°, within said intermediate vision region, following relation holds at each point along said main meridian of progression:

$$p(y) \cdot L_p / l_{A/2}(y) < \lambda A$$

in which:

p(y) is a slope of the mean sphere at a point y on the y-axis, $L_p$ is a length of progression, and $l_{A/2}(y)$ is a width of the intermediate vision region at a point y on the y-axis, $\lambda$ has a value comprised between 0.125 and 0.15 $mm^{-1}$ and in which at a point on the y-axis 18 mm below said fitting center of the lens, the following relation holds:

$$l_{A/2} \cdot A_{VP} / C_{VP} > 14 \text{ mm}$$

in which:

$l_{A/2}$ is a width of said near vision region $A_{VP}$ is a relative power addition, equal to a difference between mean sphere at a point on said main meridian of progression 18 mm below said fitting center and mean sphere at said fitting center, and $C_{VP}$ is a maximum cylinder of a horizontal segment extending over a surface of said lens.

2. A progressive multifocal ophthalmic lens according to claim 1, wherein said coefficient $\lambda$ has a value of the order of 0.14 $mm^{-1}$.

3. A progressive multifocal ophthalmic lens according to claim 1, wherein half-lines that define said angular sector intersect at the geometrical center of said lens.

4. A progressive multifocal ophthalmic lens according to claim 1, wherein the bisector of said angular sector makes an angle of less than 5° with the vertical.

5. A progressive multifocal ophthalmic lens according to claim 4, wherein the bisector of said angular sector makes an angle of less than 2°, with the vertical.

6. A progressive multifocal ophthalmic lens according to claim 1, wherein said isocylinder lines of a value equal to A/2 are asymptotic to said half-lines defining said angular sector.

7. A progressive multifocal ophthalmic lens according to claim 1, wherein said length of progression $L_p$ is the vertical distance between said fitting center and a point in said near vision region at which the power addition factor is 85° of the maximum.

8. A progressive multifocal ophthalmic lens according to claim 7, wherein said fitting center is located 4 mm above the geometrical center of said lens.

9. A progressive multifocal ophthalmic lens according to claim 1, wherein a curve that graphically represents the function:

$$p(y) \cdot L_p l_{A/2}(y)$$

in which p(y) is a slope of the mean sphere at a point y on the y-axis $L_p$ is a length of progression, and $l_{A/2}(y)$ is a width of the intermediate vision region at a point y on the y-axis, has a bell shape, the concavity of which is directed downwardly.

10. A progressive multifocal ophthalmic lens according to claim 1, wherein maximum cylinder of said lens is calculated over a horizontal segment and for those points on said lens situated at a distance of less than 20 mm from a geometrical center of said lens.

* * * * *